United States Patent
Girard

[15] 3,636,367
[45] Jan. 18, 1972

[54] FOURIER TRANSFORM OPTICAL OBJECT ANALYZER

[72] Inventor: André J. Girard, Chatillon, France
[73] Assignee: Office National D'Etudes et de Recherches Aerospatiales, Chatillon-Sous-Bagneux, France
[22] Filed: Sept. 28, 1970
[21] Appl. No.: 76,027

[30] Foreign Application Priority Data

Sept. 30, 1969 France....................6933343

[52] U.S. Cl..........................250/237, 350/162 SF
[51] Int. Cl. ..........................................H01b 5/18
[58] Field of Search..............................250/237; 350/162 SF

[56] References Cited

UNITED STATES PATENTS

| | | | |
|---|---|---|---|
| 3,090,281 | 5/1963 | Marechal et al. | 350/162 SF |
| 3,305,692 | 2/1967 | Girard | 250/237 |
| 3,370,268 | 2/1968 | Dobrin et al. | 350/162 SF |
| 3,497,287 | 2/1970 | Lang | 350/162 SF |
| 3,511,571 | 5/1970 | Ogle | 350/162 SF |

OTHER PUBLICATIONS

Paris et al., " A Method for Exceeding the Cutoff Frequency of a Bandlimited Optical System," IBM Technical Report No. 02.281, Dec. 5, 1963.

Primary Examiner—Ronald L. Wibert
Assistant Examiner—Edward S. Bauer
Attorney—Abraham A. Saffitz

[57] ABSTRACT

Fourier transform optical object analyzer comprising a plane support for an optical object to be analyzed, a mask formed with a slit registering with a line of the optical object and movable in a plane parallel to the object plane for line-by-line unmasking of the object and a grid including contiguous transparent and opaque zones bounded by curves in the form of equilateral hyperbolae. The mask is shifted step by step relatively to the optical object support and takes a plurality of discrete positions with regard to said object support. The grid is continuously shifted relatively to the mask for each position thereof and a photosensitive detector receives the light flux from the object which has passed through the slit and the grid. Means are provided for vibrating the grid relative to the object at a predetermined frequency, and for filtering the component of the output of the photosensitive detector at said frequency.

4 Claims, 9 Drawing Figures

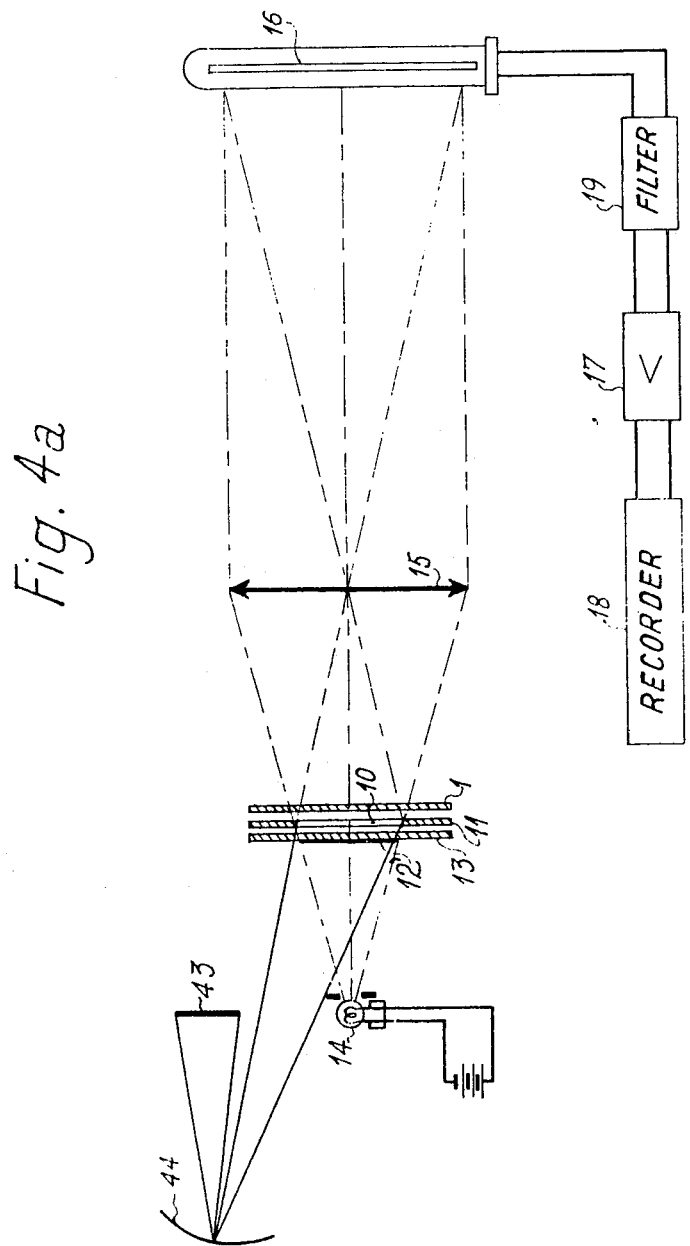

FOURIER TRANSFORM OPTICAL OBJECT ANALYZER

This invention relates to improved Fourier transform optical object analyzers.

My U.S. Pat. No. 3,305,692 issued Feb. 21, 1967 and assigned to the same assignee as the present application has disclosed Fourier transform plane object analyzers comprising means for defining a number of narrow strips on the object, means for shifting past the object as many times as there are strips therein a variable-transparency grid or lattice or the like whose structure depends upon the kinetic form of the shifting movement and is such that as it moves the grid modulates the light flux issuing from at least one straight strip of the object at a frequency depending upon the relative position of the grid and object at the beginning of the shift, and means for collecting on a radiation receiver sequential signals forming components from which the Fourier transforms of the luminance or transparency functions of the object strips can be derived.

When the strips are perpendicular to the direction of shifting (in which case it will be said that the strips are disposed along the lines of the object) and are sequentially isolated by means of a mask formed with a slit which unmasks the strips one by one, the process according to the invention of my previous U.S. patent directly provides the Fourier transforms of the luminance or transparency function of the object strips. In this case the analysis is said to be one-dimensional.

When the strips are parallel to the direction of shifting (in which case it will be said that the strips are disposed in the direction of the object columns) and are not isolated from one another by a slitted mask, each grid shift produces a component of the Fourier transform of the luminance or transparency function of each of the object strips, the component for any strip depending upon the relative position of the grid and object in the direction perpendicular to the shift direction at the beginning of each shifting movement. In this case the analysis is said to be two-dimensional.

In the previous systems just outlined, the output signals have a constant component at a time-dependent component representing, depending upon whether the particular grid used is symmetrical or antisymmetrical, the even or odd part (or a component of such even or odd part) of the Fourier transform of the luminance or transparency function.

It is an object of this invention to obviate the DC component of the signal.

ONE-DIMENSIONAL ANALYSIS

The mask slit registers with an object line parallel to the $x$-axis and the grid is moved along the $y$-axis; the spatial frequency $\sigma$ of the grid along a straight line parallel to $y$ is proportional to $x$. The grid transparency function is:

$$2\gamma = 1 + \cos 2\pi\sigma y$$

If $B(x)$ or $B(\sigma)$ (since $\sigma$ is proportional to $x$) is the luminance or transparency function of the object along the line in registration with the mask slit, the light receiver output signal is:

$$I(y) = \int_{\sigma_1}^{\sigma_2} B(\sigma)\gamma(\sigma, y) d\sigma$$

$$I(y) = \frac{1}{2}\int_{\sigma_1}^{\sigma_2} B(\sigma) d\sigma + \frac{1}{2}\int_{\sigma_1}^{\sigma_2} B(\sigma) \cos 2\pi\sigma y d\sigma \quad (1)$$

where $\sigma_1$ and $\sigma_2$ are spatial frequencies of the grid which correspond to the limits $x_1$ and $x_2$ of the mask slit. The first term of the second member of formula (1) is a constant and the second term is the even part of the Fourier transform. Since the luminance or transparency function is usually a real function, there is no need to know the odd part of the Fourier transform (in the integral Fourier development of the luminance or transparency function the imaginary part thereof corresponds to the odd part of the transform).

As already stated, it is an object of the invention to obviate the constant term in the light receiver signal expressed by formula (1) by making the grid perform a vibratory movement around its instantaneous position, the vibrating movement being independent of the actual movement of the grid relatively to the object.

Let: $y' = y + a \cos \omega t$ denote this vibratory movement. If $y'$ is substituted for $y$ in formula (1) we obtain:

$$I(y') = \frac{1}{2}\int_{\sigma_1}^{\sigma_2} B(\sigma) d\sigma$$

$$+ \frac{1}{2}\int_{\sigma_1}^{\sigma_2} B(\sigma) \cos [2\pi\sigma(y' - a \cos \omega t)] d\sigma$$

$$I(y') = \frac{1}{2}\int_{\sigma_1}^{\sigma_2} B(\sigma) d\sigma$$

$$+ \frac{1}{2}\int_{\sigma_1}^{\sigma_2} B(\sigma) \cos 2\pi\sigma y' \cos [2\pi\sigma a \cos \omega t] d\sigma$$

$$+ \frac{1}{2}\int_{\sigma_1}^{\sigma_2} B(\sigma) \sin 2\pi\sigma y' \sin [2\pi\sigma a \cos \omega t] d\sigma \quad (2)$$

The term $\cos[2\pi\sigma a \cos \omega t]$ developed in Bessel functions and sinusoidal functions products is devoid in its development of any term whose argument is in $\omega t$. The term $\sin[2\pi\sigma a \cos \omega t]$ can be written:

$$\sin[2\pi\sigma a \cos \omega t] = J_1(2\pi\sigma a) \cos \omega t + ...$$

in which $J_1$ is the Bessel function of order one.

Formula (2) can therefore be written:

$$I(y') = \frac{1}{2}\int_{\sigma_1}^{\sigma_2} B(\sigma) d\sigma$$

$$+ \frac{1}{2}J_1(2\pi\sigma a) \cos \omega t \int_{\sigma_1}^{\sigma_2} B(\sigma) \sin 2\pi\sigma y' d\sigma + ... \quad (3)$$

As already stated, the first term of the second member of formula (3) is constant. The term at the angular velocity $\omega$ is maximum for:

$$2\pi\sigma a = 1.84$$

which gives:

$$a = 0.29/\sigma$$

If we take: $\sigma = \sigma_o = (\sigma_1 + \sigma_2)/2$, the amplitude of the vibratory movement is found to be 0.29 times the grid pitch along the slit centerline.

TWO-DIMENSIONAL ANALYSIS

In this case there is neither mask nor slit; each column is sequentially scanned at staggered spatial frequencies and the convolution product:

$$I(y) = \frac{1}{2}(1 + \cos 2\pi\sigma y) * B(y)$$

$$I(y) = \frac{1}{2}\int_{y_1}^{y_2} B(y) dy + \frac{1}{2}\int_{y_1}^{y_2} B(y) \cos 2\pi\sigma(Y - y) dy \quad (5)$$

is made for each object column scanned at the frequency $\sigma$, $Y$ denoting the ordinate on the object and $Y$ denoting the ordinate on the grid while $y_1$ and $y_2$ denote the ordinates of the ends of the scanned object column (the columns are parallel to the $y$ axis).

As in the first case, the grid is vibrated relatively to the object so that:

$$Y' = Y + a \cos \omega t$$

Substituting $Y'$ for $Y$ in formula (5) we obtain:

$$I(Y') = \frac{1}{2}\int_{y_1}^{y_2} B(y) dy$$

$$+ \frac{1}{2}\int_{y_1}^{y_2} B(y) \cos [2\pi\sigma(Y' - y - a \cos \omega t)] dy$$

$$I(Y') = \frac{1}{2}\int_{y_1}^{y_2} B(y) dy$$

$$+ \frac{1}{2}\int_{y_1}^{y_2} B(y) \cos 2\pi\sigma(Y' - y) \cos [2\pi\sigma a \cos \omega t] dy$$

$$+ \frac{1}{2}\int_{y_1}^{y_2} B(y) \sin 2\pi\sigma(Y' - y) \sin [2\pi\sigma a \cos \omega t] dy \quad (6)$$

which can be written:

$$I(Y') = \frac{1}{2}\int_{y_1}^{y_2} B(y)\,dy + \frac{1}{2}J_1(2\pi\sigma a)$$
$$\cos\omega t \int_{y_1}^{y_2} B(y)\sin 2\pi\sigma(Y'-y)\,dy + \ldots \quad (7)$$

The first term of the second member of formula (7 is constant. The term at the angular velocity $\omega$ is maximum for:

$$2\pi\sigma\vartheta = 1.84$$

which gives as the previous case the value given by formula (4) for $a$. The amplitude $a$ cannot be optimized over a wide spatial frequency range; in practice, a ratio $\sigma_2/\sigma_1$ of greater than 3 is difficult to obtain.

During an object scan, $\sigma$ is defined for a given object column but each column is scanned at a different spatial frequency. $a$ must therefore be so determined that the signals at the angular velocity $\omega$ are maximum on the average. $a$ is therefore determined from formula (4), the value for $\sigma$ being taken as:

$$(\sigma_1+\sigma_2/2)$$

$\sigma_1$ and $\sigma_2$ having been defined previously.

The invention will now be described in detail with reference to the accompanying drawings wherein:

FIGS. 4a and 4b show a different one-dimensional analyzer, and

Figure 1B:
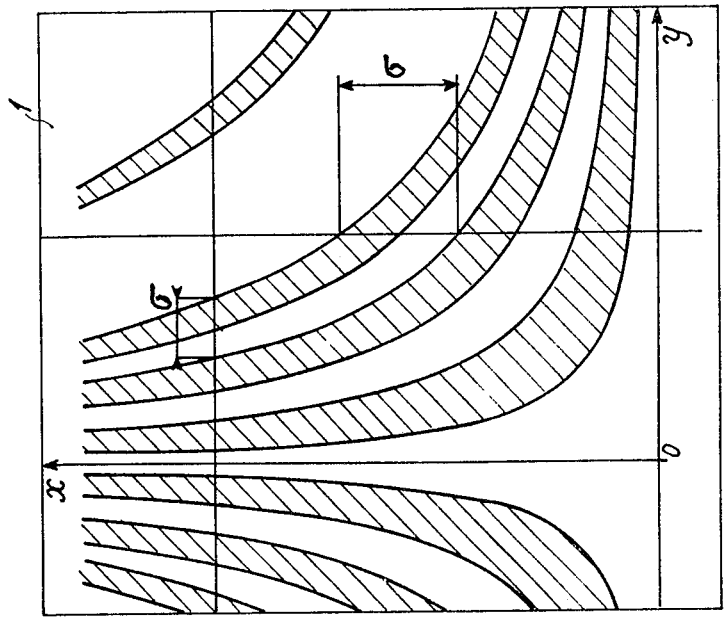
FIGS. 1a and 1b show the prior art grids used to obtain the odd part and even part respectively of the Fourier transform of an optical object.
Figure 1A:
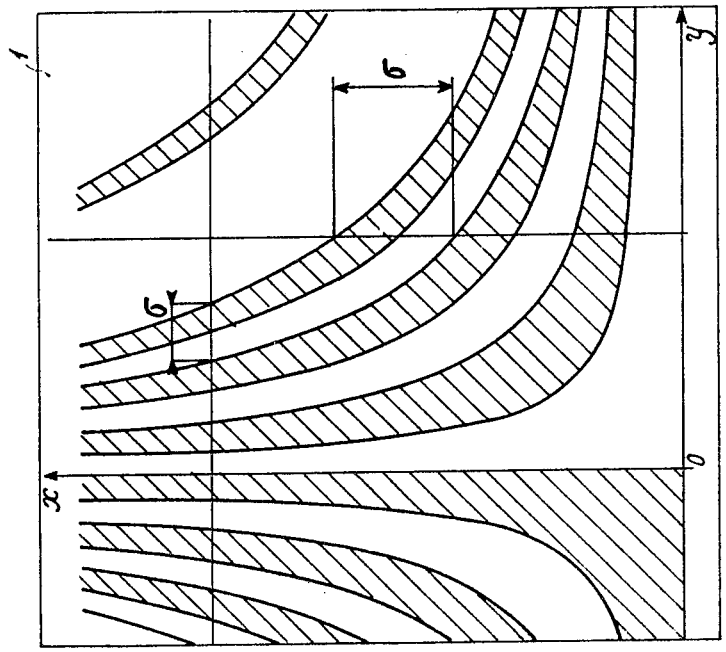

FIGS. 1a and 1b show the grids which are disclosed in U.S. Pat. No. 3,305,692 and which are used to represent the odd part and even part of exp $(-2\pi j\sigma y)$. The grids comprise transparent and opaque parts bounded by equilateral hyperbolae. The equation of the hyperbolae family of the grid of FIG. 1a is $xy = 2n\,D^2$ where $n$ denotes a positive or negative integer and $D$ denotes a predetermined length. The equation of the hyperbolae family of the grid shown in FIG. 1b is $xy = (2n-1)D^2$.

The spatial period $1/\sigma$ along a straight line of abscissa $x$ is inversely proportional to the distance $x$ from the straight line in question to the asymptote $Oy$. Also, the spatial period $1/\sigma$ along a straight line of ordinate $y$ is inversely proportional to the distance $y$ from the straight line in question to the asymptote $Ox$. Operation of the analyzer is based on the proportional relationship between $\sigma$ on the one hand and $x$ and $y$ on the other hand.

Figure 2:
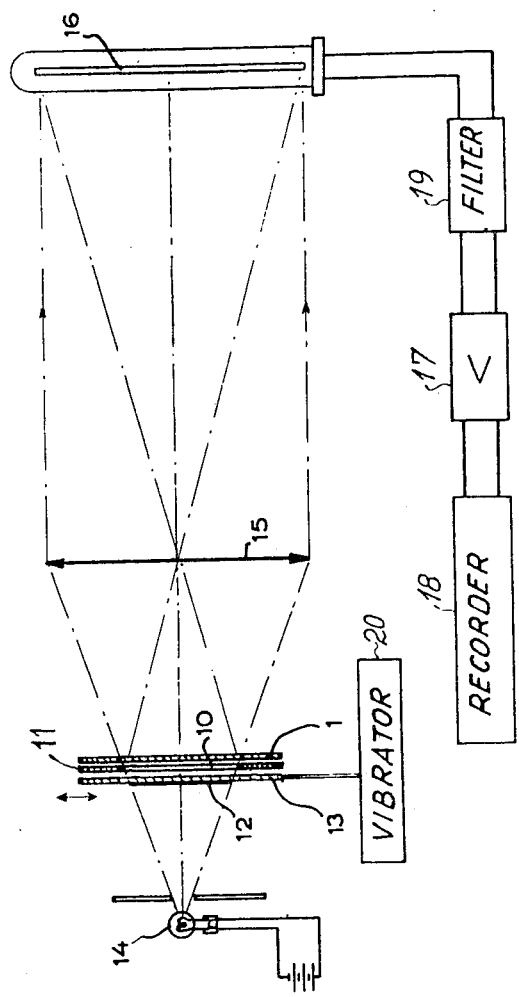
FIG. 2 is a diagrammatic view of a one-dimensional optical object analyzer according to the invention.

Referring to FIG. 2, there can be seen a transparent plate 13 on which a transparent optical object or image 12 has been formed, a mask 11 formed with a slit 10, and a grid 1, the items being placed close together in the order plate, mask and grid. The grid 1 can be moved uniformly in the direction perpendicular to the plane of FIG. 2. The plate 13 is vibrated in its plane by an appropriate vibrator 20. The direction of the vibratory movement is unimportant and can be, for instance, perpendicular to the grid movement direction. A light source 14 disposed at the focal point of a lens 15 projects the optical object or image through grid 1 on to a photoelectric cell or a photomultiplier 16. The output of cell 16 goes to a narrow-band filter 19 centered on the vibratory frequency of vibrator 20. The filter 19 is connected to an amplifier 17 which delivers its output to a recorder 18 which records function (3).

The kind of vibrator used is of no importance for the purposes of this invention and should be selected on a basis of frequency and amplitude. For instance, if $\sigma_1 = 0.1$ mm., and $\sigma_2 = 0.3$ mm., then $\sigma_0 = 0.2$ mm. and $a = 0.29 \times 0.2 \simeq 60\mu$.

Figure 3A:
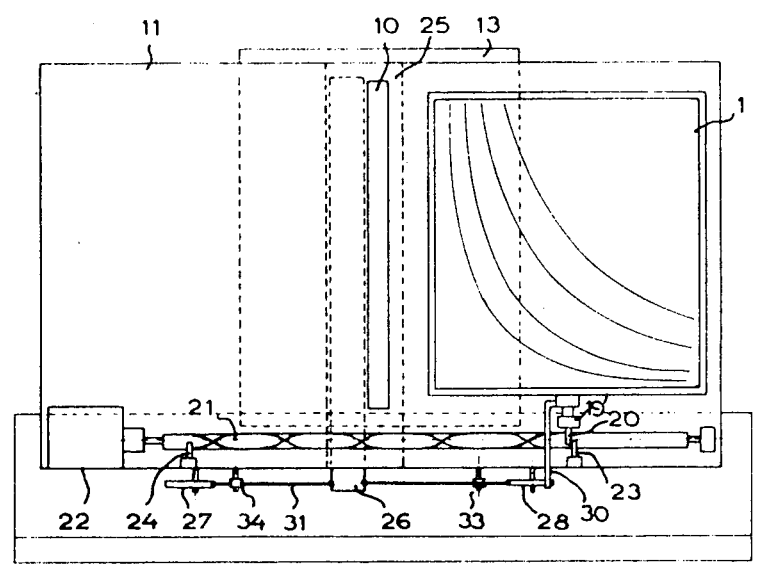
FIGS. 3a, 3b and 3c are views in greater detail of the same device as shown in FIG. 2 and show inter alia the means for shifting the object support and the grid relatively to the mask and the means for vibrating the object support relatively to the grid.
Figure 3B:
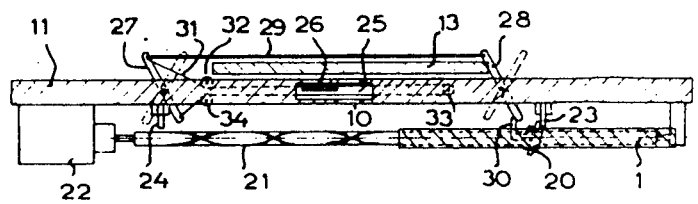
Figure 3C:
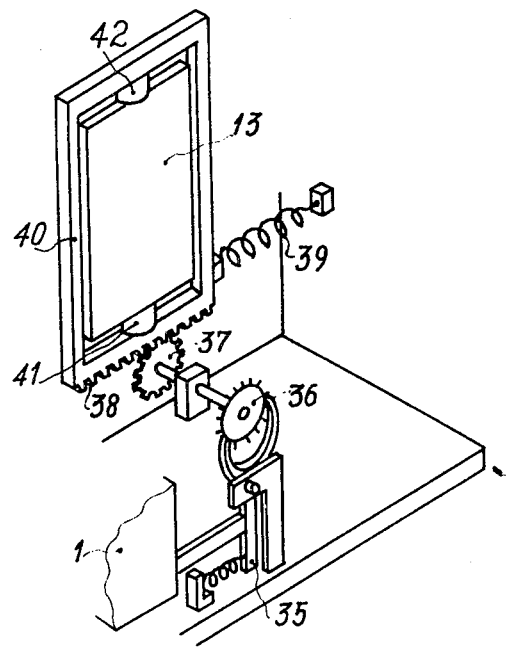

Referring now to FIGS. 3a to 3c, grid 1 is rigidly secured to a stirrup-shaped member 19' having a pin 20 following the threads of a screw 21 having two oppositely directed screw threads. Screw 21 is mounted in bearings secured to the mask 11 and is continuously driven by a motor 22 which is also secured to the mask 11. At its ends of travel the member 19' and the shank of the pin 20 abut abutments 23, 24, and the shank of pin 20 and the abutments cooperate to rotate the pin 20 around its axis. The pin end in engagement with the threads of screw 21 changes its orientation and changes over from the right-hand to the left-hand screw thread, thus reversing the direction of grid movement relatively to the mask. Preferably, the pitch of the screw thread corresponding to the return movement is longer than the screw thread corresponding to the outward movement.

Mask 11 is formed with an inside recess 25 in which a strip 26 adapted to mask or unmask slit 10 of mask 11 can move. The position of strip 26 relative to slit 10 is controlled by two levers 27, 28 which are coupled together by a rod 29, disposed on mask 11 and articulated relatively thereto and positioned at the two ends of travel of grid 1. The frame thereof comprises a rod 30 which cooperates with the bottom parts of the levers 27, 28 and pivots the same at the end of the outward movement and at the end of the return movement.

Secured to the two ends of lever 27 are the two ends of a piece of piano wire which runs over three deflecting pulleys 32–34 rigidly secured to mask 11 and which is secured to strip 26. As will be readily apparent, when the levers 27, 28 move from the solid line position in FIG. 3b, corresponding to the outward movement of the grid, to the chain-dotted line position, corresponding to the return movement of the grid, strip 26 changes from its nonmasking position to its masking position.

At each return of grid 1 (FIG. 3c) to its inoperative position it operates a lever 35 driving an escapement 36 cooperating with a pinion 37 which rotates around a spindle secured to mask 11 and which meshes with a toothed rack 38 rigidly secured to a frame 40. The support 13 is mounted in frame 40 with the interposition of two piezooxide cartridges 41, 42 energized in phase opposition by an AC generator (not shown). Frame 40 is biased in one direction by a tension spring 39 secured to the baseplate of the equipment.

The motion of the parts 1, 11, 13 and 26 is of course the intended motion. When motor 22 is switched on the grid reciprocates uniformly but with an outward movement slower than the return movement. Whenever rod 30 operates lever 27, strip 26 masks or closes slit 10. Whenever rod 30 operates the levers 27 and 35, strip 26 unmasks or opens slit 10 and, since the escapement operates, the object support 13 is stepped on by one step relative to the mask 11. Also, the support 13 vibrates relatively to grid 1.

Figure 4B:
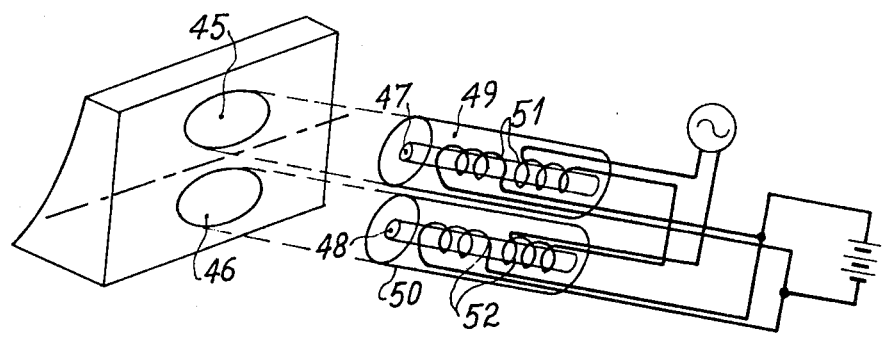

The apparatus shown in FIG. 4a comprises the same elements as the apparatus shown in FIG. 2 except for the vibrator 20 and that the optical object 12 is not secured to the object support or plate. The optical object 43 is projected to form a real image 12' on the support 13 which is e.g., a strip of frosted glass. The image 12' is projected by a mirror 44 which performs an oscillating motion around an axis which is e.g., perpendicular to slit 10 and parallel to the direction of grid movement.

On its rear face mirror 44 has (FIG. 4b) two telephone-receiver-type electromagnetic devices to vibrate it. More particularly, it has on its rear face two small soft-iron members 45, 46 acted on by electromagnets each comprising a silicon iron core 47 and 48 respectively, a soft-iron cylinder 49, 50 respectively and a winding 51, 52 respectively. The two windings are fed with a direct current and with an alternating current of the required frequency, the AC coils being oppositely directed in each of the two windings.

Figure 5:
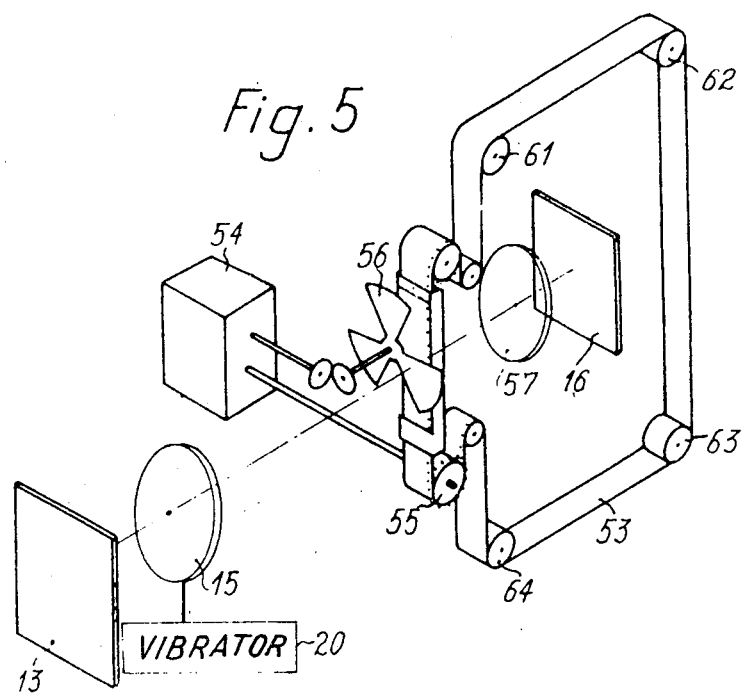
FIG. 5 shows a two-dimensional analyzer.

FIG. 5 shows a two-dimensional analyzer comprising an object support 13, which can be of any known kind such as a cathode-ray tube screen or a simple frame for receiving color transparencies or, for instance, a frosted glass screen on which images are formed through a lens. The optical object is projected by a lens 15 on the plane of a film 53 and thence via a lens 57 to a photoelectric cell 16. The film 53 forms a closed loop which runs over rollers 61–64 and which is driven continuously by a motor 54 and sprockets 55. A rotating shutter 56 is driven by the motor 54 and masks the film during changes of view.

The film 53 has been described in detail in U.S. Pat. No. 3,305,692 and will not be described again here. All that need be stated is that the film represents a number of views of the grid of one of FIGS. 1a, 1b in which the y axis is the film-unwinding axis. The grid shifts slightly in the direction Ox between consecutive views so that any single object column is scanned at the spatial frequency $\sigma_i$ by one view, at the spatial frequency $\sigma_{i+1} = \sigma_i + \Delta\sigma$ by the next and so on.

U.S. Pat. No. 3,305,692 describes different kinds of grids from those shown in FIGS. 1a and 1b. The aim of the invention is of course to obviate the constant component of the Fourier transform or components thereof in analyzers of the kind concerned, whatever kind of grid is used, by vibrating the optical object relatively to the grid.

What I claim is:

1. A Fourier transform optical object analyzer comprising a plane support for an optical object to be analyzed, a mask formed with a slit registering with a line of the optical object and movable in a plane parallel to the object plane for line-by-line unmasking of the object, a grid comprising contiguous transparent and opaque zones bounded by curves having the same spacing in a first predetermined direction, said spacing along a line parallel to said first direction varying in inverse proportion to the distance of said line from an origin in a second direction of the grid, the first direction being parallel to the mask slit, means for moving step by step the mask relatively to the optical object support in said second direction whereby said mask successively takes a plurality of discrete positions with regard to said object support, means for continuously moving the grid relatively to the mask in said second direction for each position of the mask, a photosensitive detector receiving the light flux from the object which has passed through the slit and the grid, means for vibrating the grid relative to the object at a predetermined frequency, and a band-pass filter centered on such frequency and connected to the output of the photosensitive detector.

2. A Fourier transform optical object analyzer comprising a plane support for an optical object to be analyzed, a grid comprising contiguous transparent and opaque zones bounded by curves having the same spacing in a first predetermined direction, said spacing along a line parallel to said first direction varying in inverse proportion to the distance of said line from an origin in a second direction of the grid, first means for shifting the grid relatively to the object support in the second direction whereby the grid takes up a number of consecutive discrete positions in which the object support and the grid are offset from one another by multiples of a given pitch, second means for continuously shifting the grid relatively to the object support in the first direction, a photosensitive detector receiving the light flux from the object which has passed through the grid, means for vibrating the grid relative to the object at a predetermined frequency, and a band-pass filter centered on such frequency and connected to the output of the photosensitive receiver.

3. An analyzer according to claim 1 wherein the object to be analyzed is projected on the object support through an optical system oscillating so as to form a vibratory image in the plane of the object support.

4. An analyzer according to claim 2 wherein the object to be analyzed is projected on the object support through an optical system oscillating so as to form a vibratory image in the plane of the object support.

* * * * *